Aug. 4, 1925.
E. G. BUSSE
1,548,021
SUPPORT FASTENING DEVICE
Filed Oct. 19, 1923
2 Sheets-Sheet 1
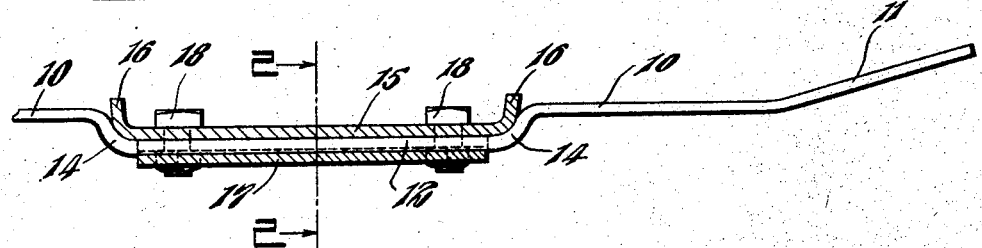
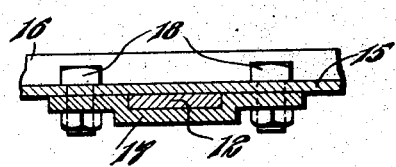
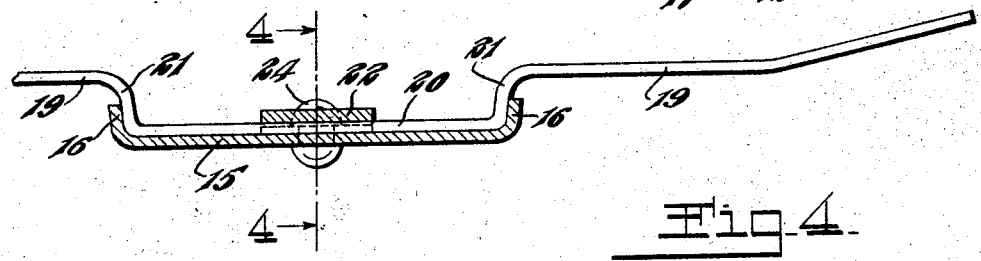
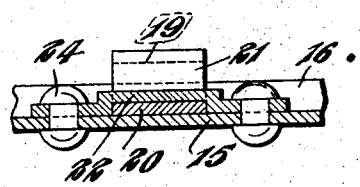
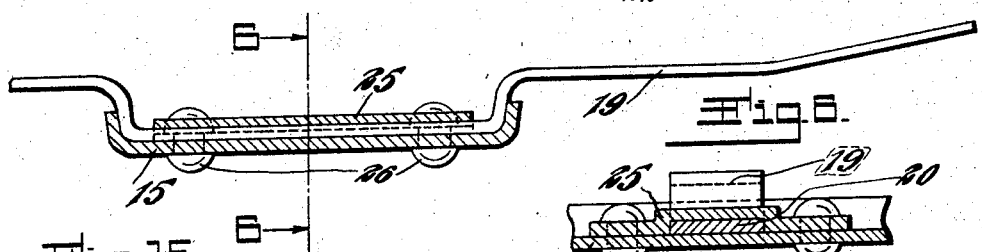
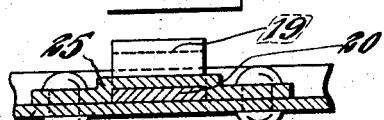
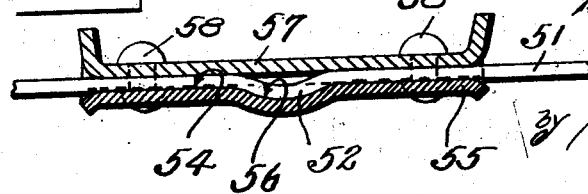
Inventor.
Edwin G. Busse.
By Cornwall, Bedell & Janus
His Attorneys.

Aug. 4, 1925.
E. G. BUSSE
1,548,021
SUPPORT FASTENING DEVICE
Filed Oct. 19, 1923
2 Sheets-Sheet 2
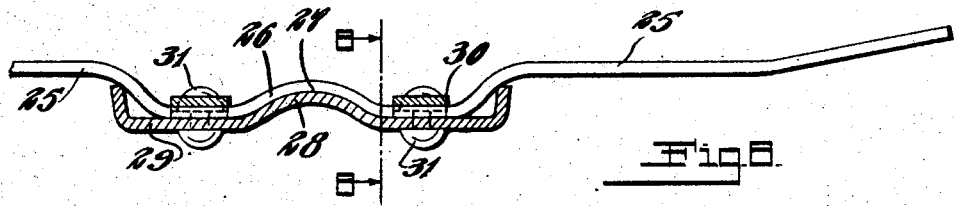
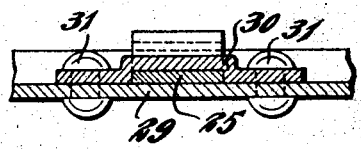
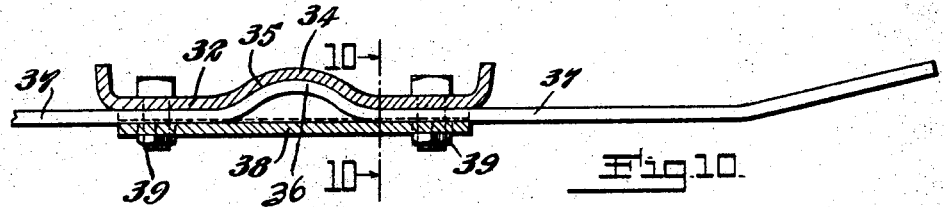
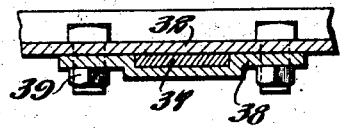
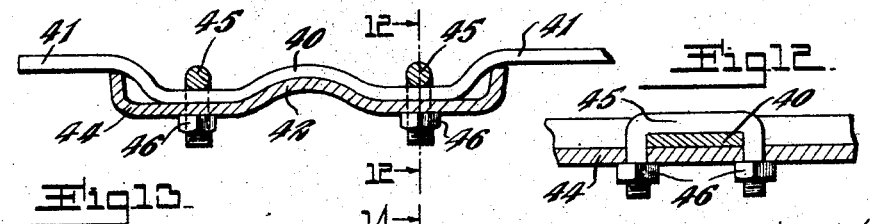
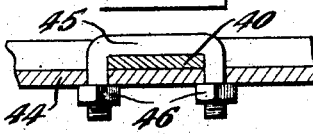
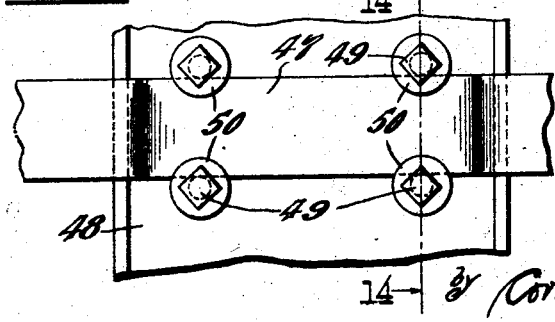
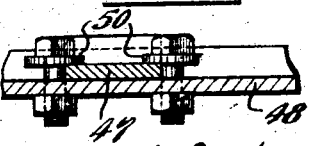
Inventor.
Edwin G. Busse.
By Cornwall, Bidell & Janus
His Attorneys.

Patented Aug. 4, 1925.

1,548,021

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SUPPORT-FASTENING DEVICE.

Application filed October 19, 1923. Serial No. 669,610.

*To all whom it may concern:*

Be it known that I, EDWIN G. BUSSE, a citizen of the United States, residing at Chicago, Illinois, have invented a certain new and useful Improvement in Support-Fastening Devices, of which the following is a specification, such as will enable others skilled in the art to which it appertains to make and use the same.

This invention relates to new and useful improvements in fastening devices for brake gear safety bars or supports.

The object of the invention is to provide a simple and efficient device for attaching a safety bar or support to a part of the truck, which device can be easily placed in position and does not require the safety bar to be apertured or otherwise mutilated.

Further objects of the invention are to provide a safety bar or support adapted to be associated with a part of a truck and form an interlocking engagement therewith, thereby dispensing with the use of clamps or other means attachable to the truck and designed to receive and support the safety bar.

Still further objects of the invention are to form the safety bar or support so that it can be readily positioned on the truck portion in proper relation therewith and which support is through its engagement with said truck portion held against longitudinal displacement and to provide simple means for holding said safety bar in engagement with said truck portion.

With these and other objects in view, my invention consists in certain novel features of construction and arrangement of parts hereinafter more fully described and claimed, and illustrated in the accompanying drawings, in which—

Figure 1 is a side elevational view of a safety bar with the truck portion to which it is attached shown in cross section.

Figure 2 is a cross section taken on line 2—2 of Figure 1.

Figure 3 is a modified form showing the safety bar attached to the upper face of the truck portion.

Figure 4 is a cross section taken on line 4—4 of Figure 3.

Figures 5 and 6 show another modified form of fastening device.

Figure 7 is a side elevational view of the safety bar attached to the upper face of the truck portion and provided with a formation which is designed to engage a cooperating formation formed in the truck portion and projecting upwardly therefrom.

Figure 8 is a vertical cross section taken on line 8—8 of Figure 7.

Figure 9 shows another modified form wherein the safety bar is provided with a formation adapted to be seated in a recessed portion formed in the truck portion.

Figure 10 is a vertical section taken on line 10—10 of Figure 9.

Figure 11 is a view similar to Figure 7 and showing modified means for holding the safety bar to the truck portion.

Figure 12 is a vertical section taken on line 12—12 of Figure 11.

Figure 13 is a fragmental plan view of a spring plank and a safety bar and showing modified means for attaching the safety bar to the spring plank.

Figure 14 is a vertical cross section taken on line 14—14 of Figure 13.

Figure 15 is another modified form of the safety bar and the attaching bracket therefor.

Heretofore the mounting of the safety bar in its proper position on the truck was accomplished by means of a clamp or other suitable support which was secured to the spring plank and received and supported the safety bar in proper position.

The present invention contemplates an arrangement whereby the safety bar is supported directly by the spring plank or other part of a car truck and is in interlocking engagement therewith, thereby holding said bar against longitudinal movement. This interlocking engagement between the truck portion and the safety bar or support is accomplished by means of a projection or an abrupt bend formed either in the safety bar or in the truck portion or both and designed to cooperatively engage the other member.

The safety bar is held to the truck portion in any suitable manner, such as straps, U-shaped bolts or other means and these attaching means may be either permanently fixed to the truck portion or may be detachable therefrom.

Referring by numerals to the accompanying drawings, and particularly to the forms shown in Figures 1 and 2, 10 indicates a safety bar or support having inclined free ends 11 which are designed to cooperate with a part of the brake beam and having a central portion 12 which is depressed, thereby forming shoulders 14. These shoulders, when the central portion 12 is placed against the underside of a spring plank 15, engage the flanged sides 16 thereof and hold said safety bar against longitudinal movement. The safety bar is held to the truck portion 15 by means of a bracket 17 which holds said bar against lateral movement. Bracket 17 is held in position on truck portion 15 by suitable fastening devices which, in the present instance, consist of bolts and nuts 18.

In the form shown in Figures 3 and 4 the safety bar 19 is provided with a central depressed portion 20 which rests on the upper face of truck portion 15. Shoulders 21 extending upwardlly from the straight depressed portion 20 engage the inner sides of upwardly presented flanges 16 of truck portion 15 and hold safety bar 19 against longitudinal movement. A strap 22 extends transversely of safety bar 19 and holds the latter in position on truck portion 15. Suitable fastening devices such as rivets 24 secure the ends of strap 22 to truck portion 15.

In the form illustrated in Figures 5 and 6 the arrangement of safety bar 19 and truck portion 15 is similar to the one shown in Figures 3 and 4 but instead of using a narrow strap such as shown in the aforesaid figures a comparatively wide strap 25 is used to hold the safety bar to its seat on the truck portion 15 and said strap is held in position on truck portion 15 by rivets 26 arranged in pairs on each side of bar 19.

In the forms shown in Figures 7 and 8 the central portion of safety bar 25 is bent upwardly as indicated at 26 to form a seat 27 for an upwardly presented bend or bulge portion 28 pressed out or otherwise formed in the truck portion 29. Comparatively narrow straps 30 are arranged in each side of bend or curve 26 and straddle member 25. These straps are secured to truck portion 29 by suitable fastening devices 31.

In Figures 9 and 10 a truck portion 32 is provided with an upwardly curved formation 34 and seated in a recess 35 thus formed in the underside of member 32 is a curved portion 36 formed in safety bar 37. This safety bar is secured to truck portion 32 by a member 38 which is held in position by fastening devices 39. The seating of the bent portion 36 of bar 37 in the recess formed in the underside of member 32 forms an interlocking engagement between the truck portion and the safety bar whereby the latter is held against longitudinal movement while plate 38 prevents lateral displacement of the safety bar.

In Figures 11 and 12 the upwardly curved portion 40 of bar 41 forms a seat for the upwardly bulged portion 42 of truck portion 44 so that safety bar or support 41 is locked against longitudinal movement. Bar 41 is attached to truck portion 44 by means of U-shaped bolts 45 which straddle said bar and have their ends secured to truck portion 44 by nuts 46.

In Figures 13 and 14 bar 47 is held to truck portion 48 by bolts 49 which are secured to truck portion 48 and are provided with washers or annular portions 50 which when said bolts are tightened in position engage the edges of bar 47 and secure the latter in position on truck portion 48.

In Figure 15 is shown a support or bar 51 having a bend or jog 52. This support is received in a channel 54 formed longitudinally on one side of bracket 55. A seat or depression 56 is formed transversely in the channeled side of the bracket and receives the bend or jog 52 of support 51. Thus the support is held against longitudinal movement by the interengagement of bend 52 and seat 56 while the channel 54 prevents the lateral movement of the support. The bracket is attached to the truck part 57 by suitable fastening devices, such as rivets 58.

When the bracket 55 is secured to truck part 57, support 51 is held from displacement from its seat in the bracket by said truck part.

The fastening devices of my improved construction contain but few parts and secure the support directly to the truck part, thereby eliminating separate means for attaching the support to the bracket.

While I have shown and described the preferred forms of my support fastening devices, it is obvious that minor changes in the construction and arrangements of parts of the invention could be made and substituted for those herein shown and described, without departing from the spirit of my invention.

I claim:

1. In a car truck construction, the combination with a part of a truck, of a brake beam support formed with a depressed portion having shoulders whereby said portion is adapted to form interlocking engagement with the sides of said truck part, a bracket provided with a channel for receiving the horizontal part of said depressed portion and holding it against said truck part and engaging the sides and top of the horizontal part of said depressed portion, and detachable means for removably securing said bracket on both sides of said support to said truck part.

2. In a car truck construction, the combination with a part of a truck, of a safety bar having formed in its length a depressed portion provided with shoulders, said depressed portion being adapted to be fitted against said truck part, whereby said shouldered portion forms interlocking engagement with the sides of said truck part, a bracket detachably secured to said truck part and engaging the sides and top of the horizontal part of said depressed portion for holding said safety bar in engagement with said truck part, and bolts for removably securing said bracket to said truck part.

3. In a car truck construction, the combination with a part of a truck provided with a formation, of a support having a formation adapted to engage the formation of said truck part and lock said support against movement, and a transversely channeled bracket secured to said truck part for receiving said support in interlocking engagement with said truck part.

4. The combination of a part of a truck provided with flanged portions, a brake beam safety bar provided with shouldered portions adapted to engage said flanged portions and interlock said safety bar and said truck part, and a channeled bracket having seated therein said support for maintaining said safety bar and said truck part in their interlocked relation.

5. The combination of a part of a truck, a brake beam safety bar provided with shouldered portions for engaging said truck part and holding said bar against longitudinal movement, a channeled bracket for receiving said bar securing it to said truck part against movement in all directions, and fastening devices for said bracket.

6. The combination with a spring plank, of a brake beam safety bar provided with shouldered portions for engaging the sides of said plank and holding said bar against longitudinal movement, and a channeled bracket attached to said spring plank and locking said safety bar against movement in vertical and lateral directions.

In testimony whereof I hereunto affix my signature this 13th day of October, 1923.

EDWIN G. BUSSE.